(12) United States Patent
Feng

(10) Patent No.: US 11,054,627 B2
(45) Date of Patent: Jul. 6, 2021

(54) FOUR-DIMENSIONAL MULTI-PLANE BROADBAND IMAGING SYSTEM BASED ON NON-REENTRY QUADRATICALLY DISTORTED (NRQD) GRATING AND GRISM

(71) Applicant: Yan Feng, Xinmi (CN)

(72) Inventor: Yan Feng, Xinmi (CN)

( * ) Notice: Subject to any disclaimer, the term of this patent is extended or adjusted under 35 U.S.C. 154(b) by 181 days.

(21) Appl. No.: 16/465,451

(22) PCT Filed: Aug. 24, 2017

(86) PCT No.: PCT/CN2017/098805
§ 371 (c)(1),
(2) Date: Jun. 10, 2019

(87) PCT Pub. No.: WO2019/037020
PCT Pub. Date: Feb. 28, 2019

(65) Prior Publication Data
US 2020/0174243 A1    Jun. 4, 2020

(51) Int. Cl.
*G02B 5/18* (2006.01)
*G02B 21/36* (2006.01)
(Continued)

(52) U.S. Cl.
CPC ........... *G02B 21/361* (2013.01); *G02B 21/16* (2013.01); *G02B 27/4211* (2013.01); *G02B 27/4277* (2013.01); *G03H 1/0248* (2013.01)

(58) Field of Classification Search
CPC .. G02B 21/361; G02B 21/16; G02B 27/4211; G02B 27/4277; G02B 5/04; G02B 5/18;
(Continued)

(56) References Cited

U.S. PATENT DOCUMENTS 6,464,357 B1 * 10/2002 Otten, III ............... A61B 3/107
                                                        351/212
6,975,457 B1    12/2005 Greenaway et al.
(Continued)

FOREIGN PATENT DOCUMENTS

CN    106770131 A    5/2017
GB      2504188 A    1/2014
WO      9946768 A1   9/1999

OTHER PUBLICATIONS

Blanchard, P. M., et al., "Broadband Simultaneous Multiplane Imaging," Optics Communications, vol. 183, No. 1, pp. 29-36 (Sep. 1, 2000).
(Continued)

*Primary Examiner* — Arnel C Lavarias
(74) *Attorney, Agent, or Firm* — Maschoff Brennan

(57) ABSTRACT

Disclosed is a four-dimensional (4D: 3D+time) multi-plane broadband imaging apparatus capable of recording 3D multi-plane and multi-colour images simultaneously. The apparatus includes: one or more non-reentry quadratically distorted (NRQD) gratings which can produce a focal length and a spatial position corresponding to each diffraction order, thus simultaneously transmitting wavefront information between multiple object/image planes and a single image/object plane; a grism system which can limit chromatically-induced lateral smearing by creating a collimated beam in which the spectral components are laterally displaced; a lens system which is configured to adjust the optical path; and the optical detector(s). In an optical system, the multiple object/image planes, the lens system, the grism system, the NRQD grating(s), the optical detector(s) and the single image/object plane are located on the same optical (Continued)

axis. This simple, easy-to-use and compact apparatus can meet many different requirements and serve a large range of high throughput applications.

20 Claims, 10 Drawing Sheets

(51) Int. Cl.
  *G02B 21/16* (2006.01)
  *G02B 27/42* (2006.01)
  *G03H 1/02* (2006.01)

(58) Field of Classification Search
  CPC .......... G02B 2005/1804; G02B 5/1814; G02B 5/1819; G02B 5/1823; G02B 5/1842; G02B 5/1866; G02B 5/1871; G02B 5/32; G02B 21/0052; G02B 21/006; G02B 21/0064; G02B 21/0072; G02B 21/0076; G02B 27/42; G02B 27/4205; G02B 27/4272; G02B 27/44; G03H 1/0248
  USPC ....... 359/569, 1, 15, 19, 362, 363, 368, 369, 359/558, 566, 574, 575, 831, 837
  See application file for complete search history.

(56) References Cited

U.S. PATENT DOCUMENTS

| | | |
|---|---|---|
| 2006/0175528 A1 | 8/2006 | Greenaway et al. |
| 2015/0036068 A1* | 2/2015 | Fattal ................. G02B 30/27 349/15 |
| 2018/0216997 A1* | 8/2018 | Yokino ................ G01J 3/2803 |
| 2019/0018186 A1* | 1/2019 | Fattal ............... G02F 1/133602 |

OTHER PUBLICATIONS

Dalgarno, P. A., et al., "Multiplane Imaging and Three Dimensional Nanoscale Particle Tracking in Biological Microscopy," Optics Express, vol. 18, No. 2, pp. 877-884 (Jan. 18, 2010).

Feng, Y., et al., "Chromatically-corrected, high-efficiency, multi-colour, multi-plane 3D imaging," Optics Express, vol. 20, No. 18, pp. 20705-20714 (Aug. 27, 2012).

Feng, Y., et al., "Multi-mode microscopy using diffractive optical elements," Engineering Review, vol. 31, No. 2, pp. 133-139 (2011).

Traub, W. A., et al., "Constant-dispersion grism spectrometer for channeled spectra," Journal of the Optical Society of America A, vol. 7, No. 9, pp. 1779-1791 (Sep. 1990).

Abrahamsson, S., et al., "Fast-multicolor 3D imaging using aberration-corrected multifocus microscopy," Nature Methods, vol. 10, No. 1, pp. 60-63 (Jan. 2013).

* cited by examiner

--Prior Art--

--Prior Art--

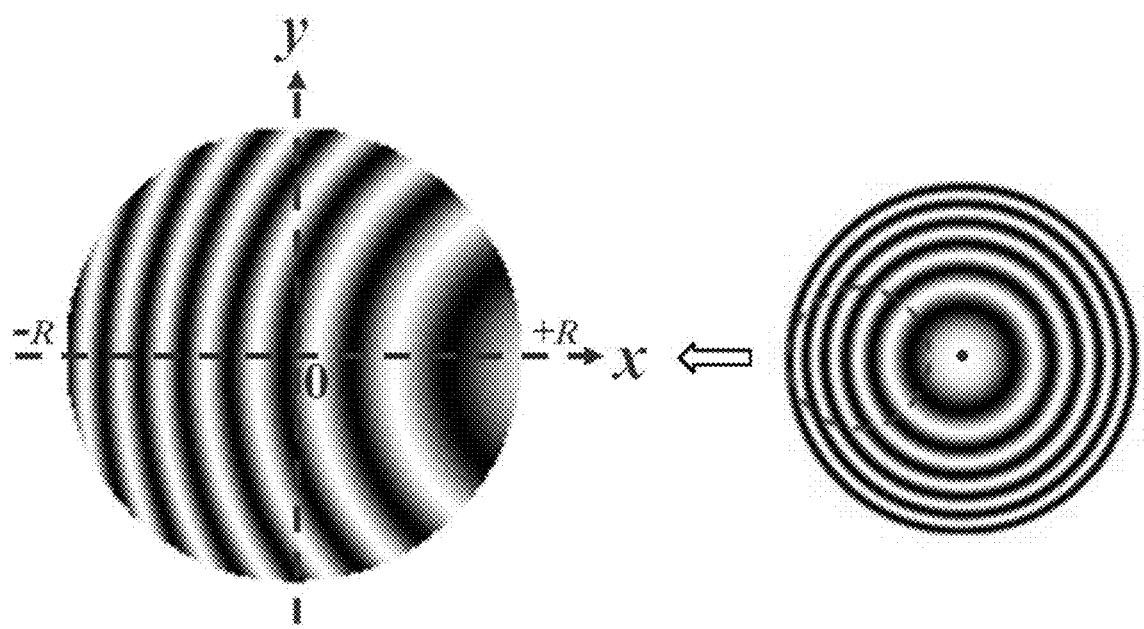
Figure 3. A demonstration of a QD grating structure in an x-y Cartesian coordinate system.
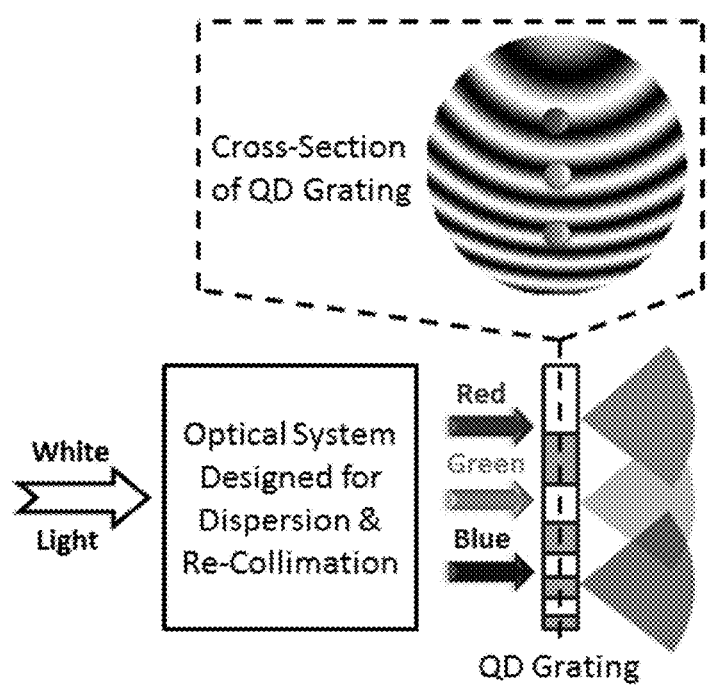
Figure 4. Pre-dispersion and collimation of incident broadband light before the QD grating can correct the chromatic dispersion induced by the QD grating.

--Prior Art--

--Prior Art--

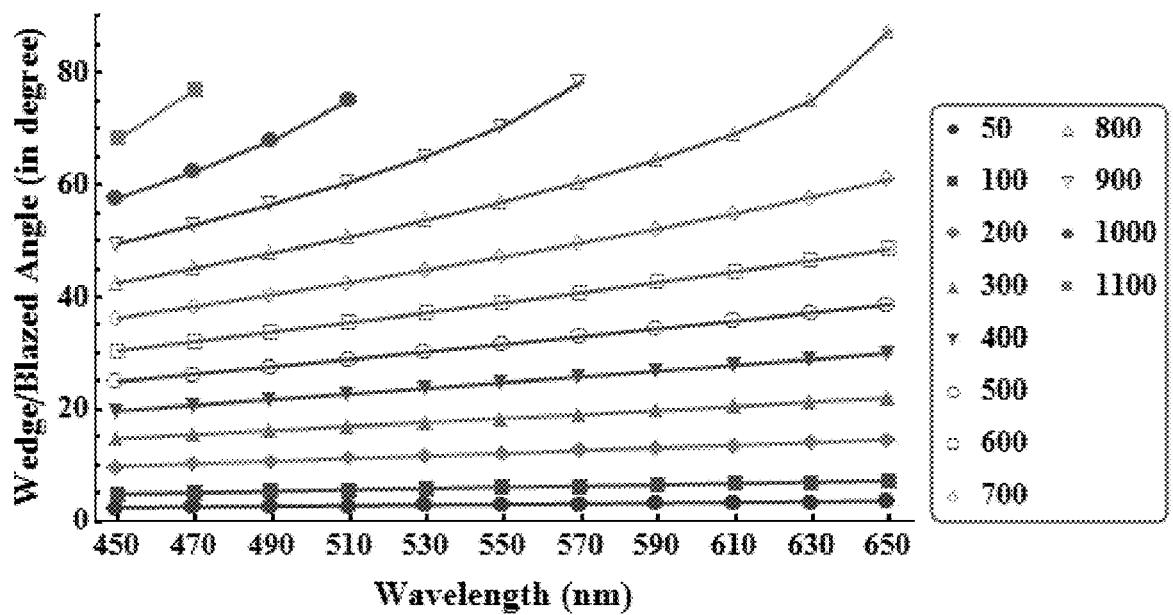
*Figure 10. For a substrate of B270 (SCHOTT) glass, the wedge/blazed angle of a grism can be customized at a specific un-deviated wavelength. The legends mark the number of grooves of blazed gratings (lines/mm), corresponding to the joint lines from bottom to top in the graphs, respectively.*

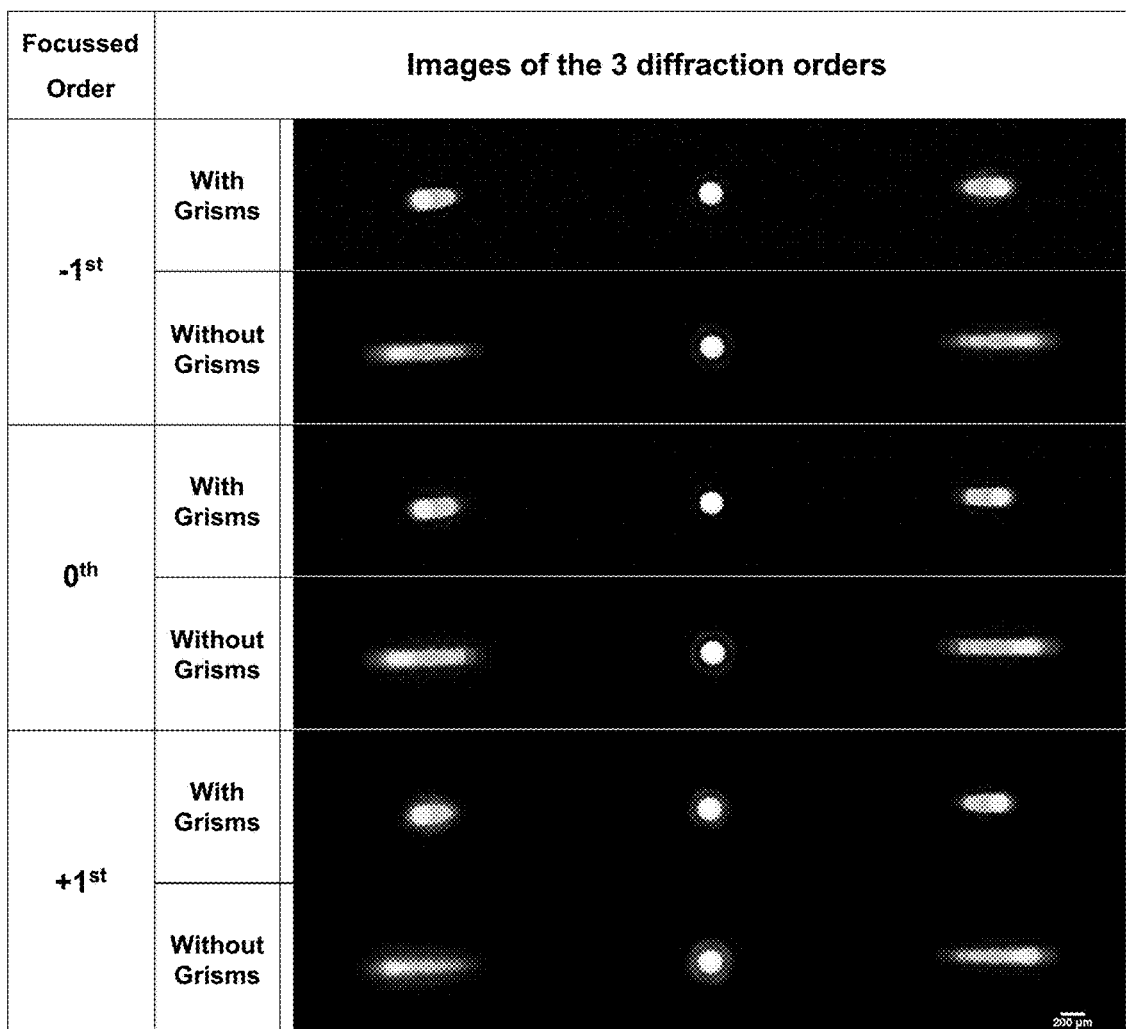
*Figure 11. Yan's rainbow.*
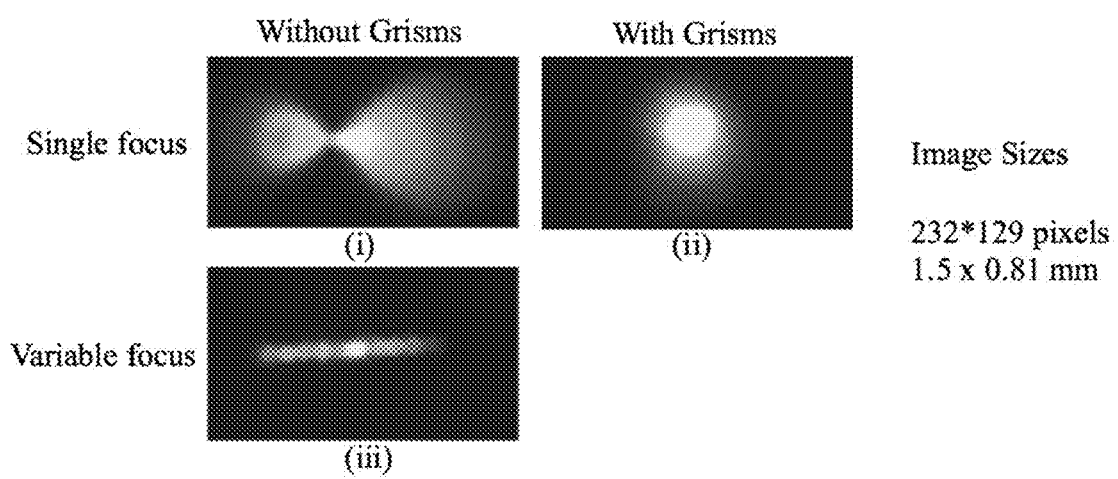
*Figure 12. False colour images from a bandpass-filtered white light source measured: (i) without chromatic correction by grisms; (ii) with chromatic correction by grisms; (iii) at optimal foci for each colour without chromatic correction by grisms.*

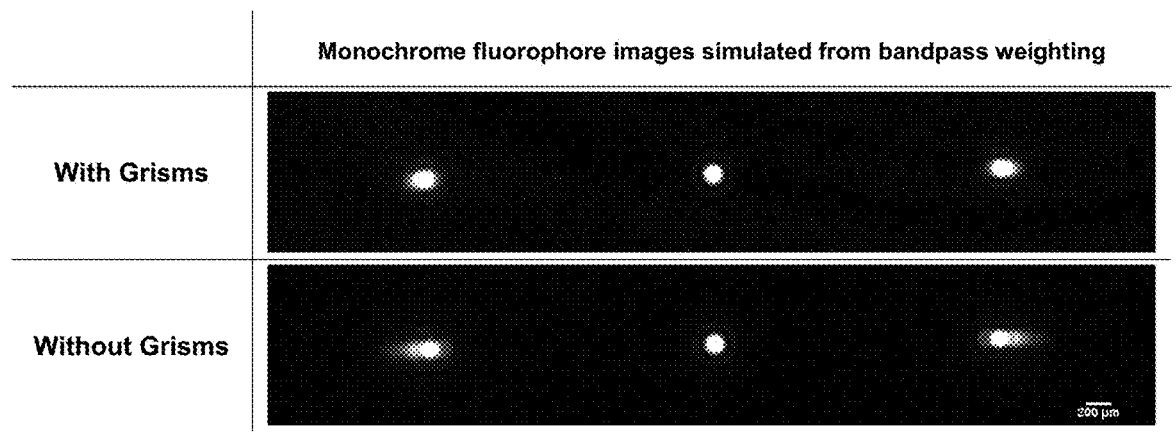
Figure 13. *4D three-plane broadband images of eGFP fluorophore with and without chromatic correction by grisms, in which white light and a series of bandpass filters were combined to simulate microscopy imaging.*
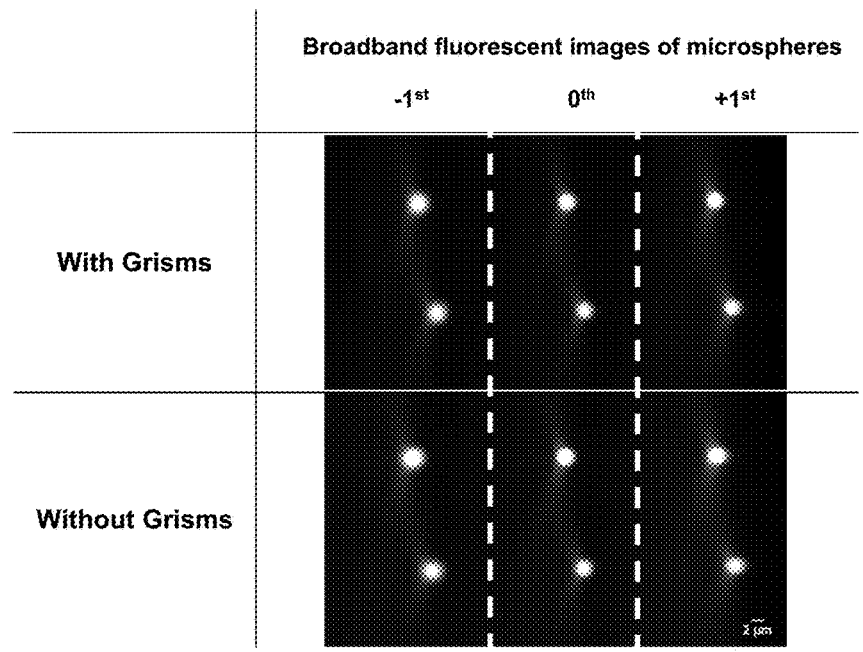
Figure 14. *4D three-plane broadband microscopy images of fluorescence microspheres with and without chromatic correction by grisms.*

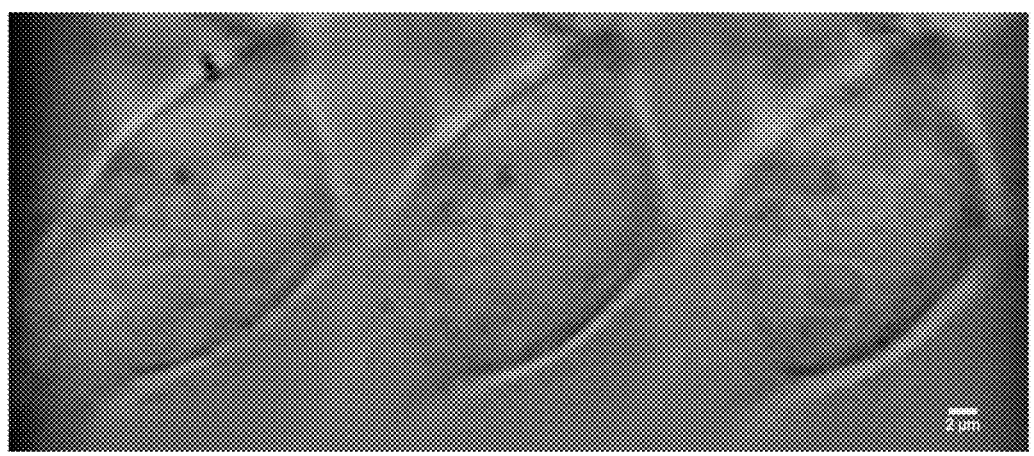

*Figure 15. Bright field 4D three-plane broadband microscopy images of HeLa living cells. The separation between each in-focus image ($\Delta z$) is 2.3μm and the bandwidth is 525 ±39nm.*

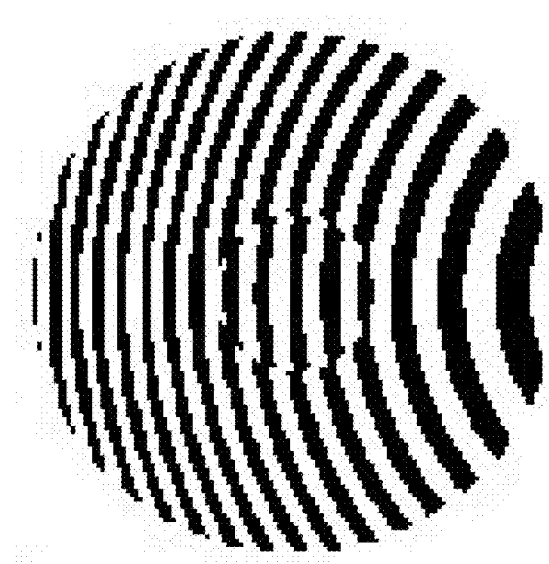

*Figure 16. By combining the phase contrast imaging mode with multi-plane imaging principles, an NRQD grating with this type of mask pattern can be utilized for 4D three-plane broadband phase contrast microscopy imaging.*

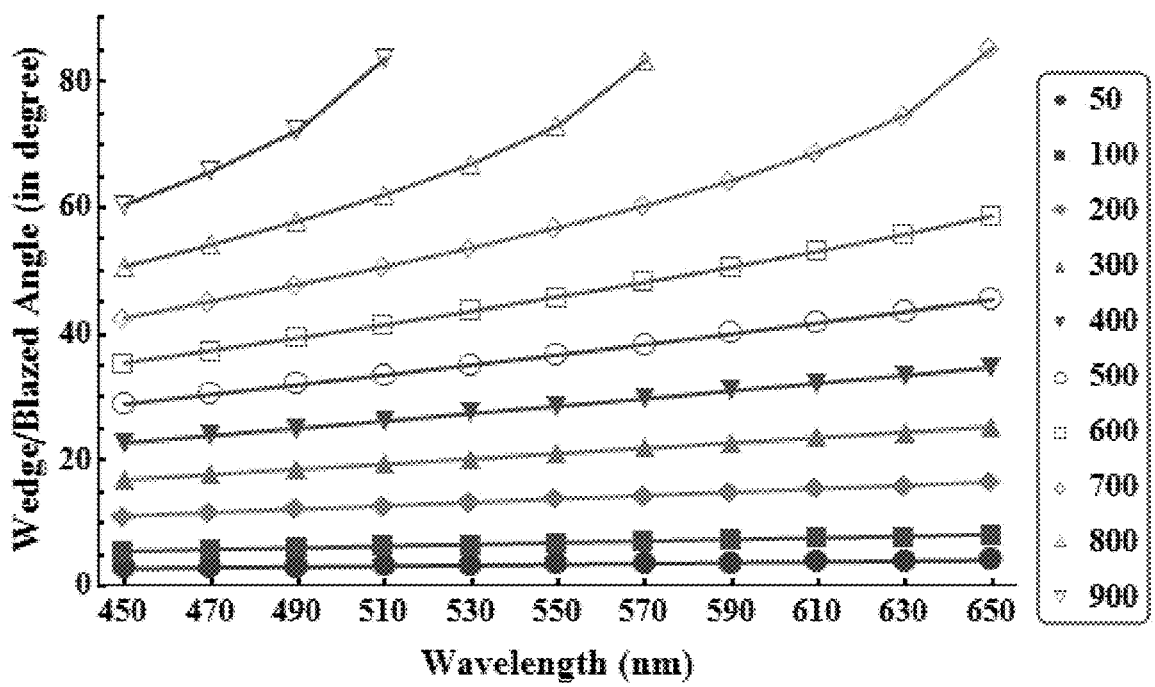

*Figure 17. For a substrate of fused silica, the wedge/blazed angle of a grism can be customized at a specific un-deviated wavelength. The legends mark the number of grooves of blazed gratings (lines/mm), corresponding to the joint lines from bottom to top in the graphs, respectively.*

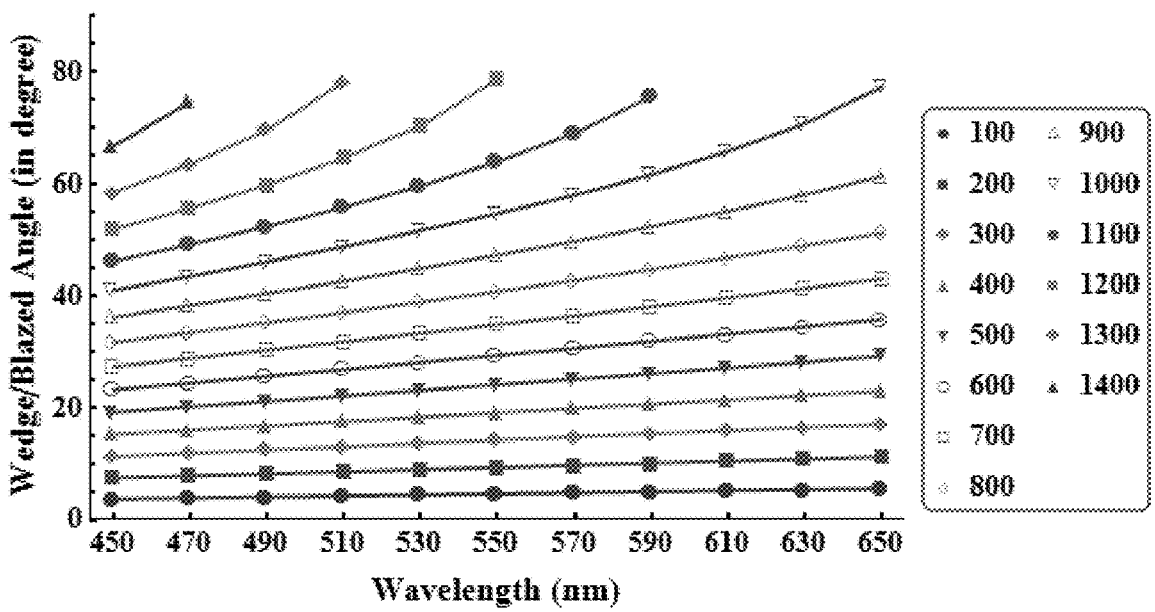

*Figure 18. For a substrate of N-BAF10 (SCHOTT) glass, the wedge/blazed angle of a grism can be customized at a specific un-deviated wavelength. The legends mark the number of grooves of blazed gratings (lines/mm), corresponding to the joint lines from bottom to top in the graphs, respectively.*

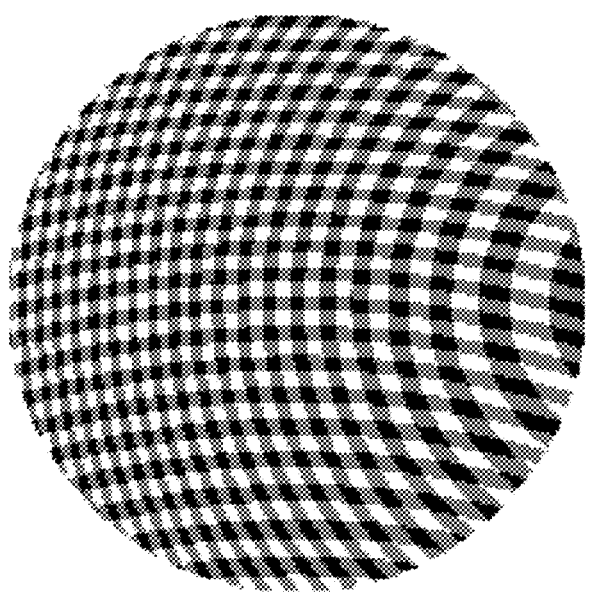

*Figure 19. Schematic of the mask pattern of an NRQD grating with "crossed" structure, by which the images of nine separate object planes can be simultaneously obtained and split across a single image plane.*

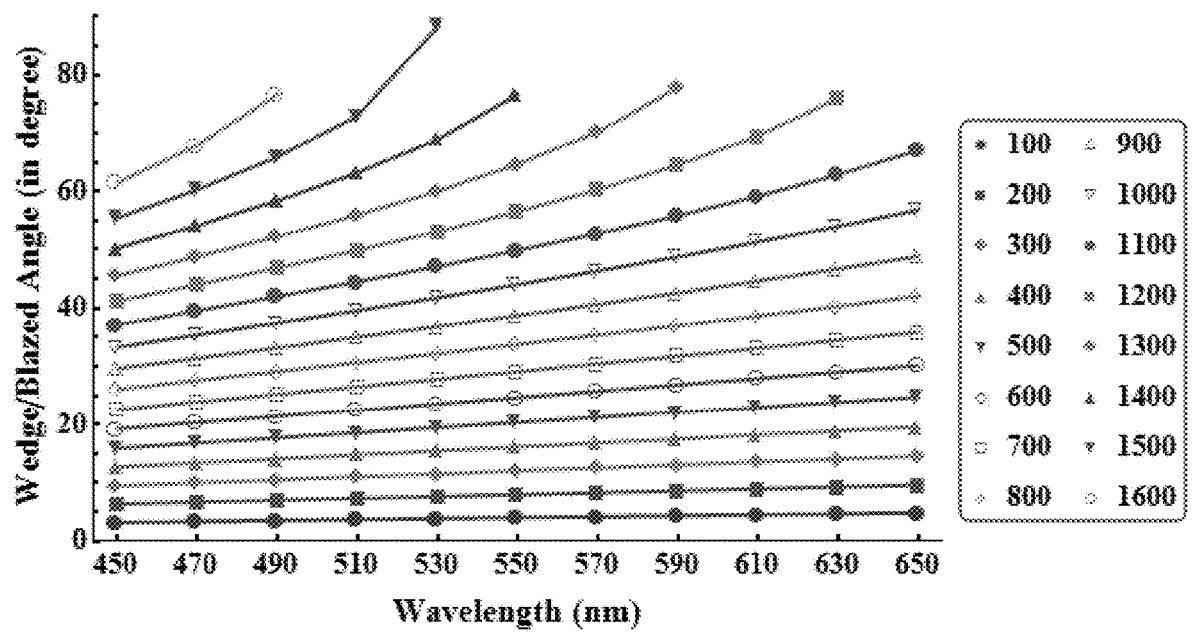

*Figure 20. For a substrate of N-SF11 (SCHOTT) glass, the wedge/blazed angle of a grism can be customized at a specific un-deviated wavelength. The legends mark the number of grooves of blazed gratings (lines/mm), corresponding to the joint lines from bottom to top in the graphs, respectively.*

FOUR-DIMENSIONAL MULTI-PLANE BROADBAND IMAGING SYSTEM BASED ON NON-REENTRY QUADRATICALLY DISTORTED (NRQD) GRATING AND GRISM

FIELD OF THE INVENTION

This invention relates to an optical system for four-dimensional (4D: 3D+time) multi-plane broadband imaging which can transfer 4D wavefront information between object and image spaces, i.e. simultaneously capturing multi-colour images from several object planes on a single image plane, or by an alternative implementation, simultaneously recording chromatically-corrected images from a single object plane on a few image planes. This technique is versatile enough to combine with various modern techniques including microscopy, astronomical optics, optical data storage, biomedical imaging, wavefront analysis and virtual/augmented reality, and will serve a large range of applications in academic research and industry.

BACKGROUND

The recent emergence of super-resolution microscopy imaging techniques has surpassed the diffraction limit to improve image resolution. Despite the breakthroughs in spatial resolution, high temporal resolution remains a challenge. Simultaneous multi-plane imaging has been increasingly explored, which opens the possibility for real time imaging of rapidly changing objects in cell-biology, fluid-flow problems and other high-speed, 3D tracking applications. In a technique originally developed by Blanchard and Greenaway, a three-dimensional (3D) imaging system based on a diffractive optical element (DOE) in the form of an off-axis Fresnel zone plate can be utilized to perform simultaneous three-plane imaging using a simple, on axis optical set-up (A. H. Greenaway and P. M. Blanchard, 'Three-dimensional imaging system', International application published under the patent cooperation treaty (PCT), PCT/GB99/00658, (1999)). The DOE, which behaves like a multi-focus "lens" but utilizes the principle of diffraction instead of refraction, provides an order-dependent focussing power to generate several images. However, due to the inherent dispersion property of non-zero diffraction orders, this DOE based technique had to be narrow-band to limit the incident spectral bandwidth and thus chromatic dispersion, restricting photon flux and hindering application to multiple-fluorophore life science imaging especially when the illumination source of samples was intrinsically faint. A few chromatic correction schemes were proposed which could in principle manipulate a polychromatic incident beam, output a pre-dispersed collimated beam and thus be used in combination with a DOE-based 3D broadband optical system for multi-colour imaging without sacrificing too much photon flux (P. M. Blanchard and A. H. Greenaway, 'Broadband simultaneous multiplane imaging', Optics Communications 183(1), 29-36 (2000); Y. Feng, et al. 'Optical system', UK Patent Application No. GB2504188-A, (2013)). However, due to the limitations in design of the key optical elements and the imaging system, these schemes were only applicable to chromatic correction tests; not real 3D multi-plane broadband imaging. Therefore in order to make this technique available for 4D multi-plane broadband imaging, I have invented an approach to analytically design the key optical elements and set up the imaging system with well-matched parameters of a grating-grism combination, such that the previous optical apparatus can be effectively improved and be versatile enough to combine with various techniques (i.e. microscopy, astronomical optics, optical data storage, biomedical imaging, wavefront analysis and virtual/augmented reality).

1. The Previous 3D Narrow-Band Imaging System and its Deficiencies

The original 3D narrow-band imaging system was comprised of a DOE, a lens system (with a single or multiple lenses), a narrow bandpass filter and some apparatus for imaging (i.e. light source and camera). FIG. 1 is a schematic of the basic design of this 3D narrow-band imaging system. QD (quadratically distorted) grating, which is a form of DOE, allows multiple object planes with a separation of $\Delta z$ to be simultaneously imaged on a single image plane. It is put in the telecentric position for equal magnification of the images (P. A. Dalgarno, et al. 'Multiplane imaging and three dimensional nanoscale particle tracking in biological microscopy', Optics Express 18(2), 877-884 (2010)).

$f_g$, the equivalent focal length of diffraction order m of a QD grating, can be expressed as, $$f_g = \frac{R^2}{2mW_{20}} \quad (1)$$

where R is the radius of the QD grating aperture and $W_{20}$ is the standard coefficient of defocus. The focal lengths $f_g$ are equal and opposite in sign for any m diffraction orders.

The separation between object planes $\Delta z$ can be written as, $$\Delta z = \frac{f_{eff}^2}{f_g M^2} \quad (2)$$

where $f_{eff}$ is the effective focal length of the lens system and M is the magnification of the microscope objective.

Therefore the image separation on camera plane $\Delta d$ can be written as, $$\Delta d = f_{eff}\left[\arcsin\left(\frac{m\lambda}{d_0}\right)\right] \quad (3)$$

where $\lambda$ is the incident wavelength and $d_0$ is the central period of the QD grating.

In principle, the maximum dispersion across the QD grating $s_g$ can be given by, $$s_g = \frac{\Delta\lambda R^2}{2W_{20}d_0} \quad (4)$$

where $\Delta\lambda$ is the bandwidth of incident spectrum.

Due to the practical requirements of broadband imaging and reasonable photon flux, a dispersion device was implemented in the 3D imaging system to correct the chromatic distortion of non-zero diffraction orders induced by QD grating and reduce the energy loss. P. M. Blanchard and A. H. Greenaway demonstrated a chromatic correction scheme which used a pair of reflective blazed gratings and a folded optical path to compensate for the chromatic distortion by introducing an opposing chromatic shear, as shown in FIG. 2 (P. M. Blanchard and A. H. Greenaway, 'Broadband simultaneous multiplane imaging', Optics Communications 183(1), 29-36 (2000)). The amount of chromatic shear was controlled by changing the distance between the blazed gratings but, because of the folded path, changing the grating separation necessitates adjustments of the angle and/or position of various optical components. Adjusting these additional parameters complicates the system, making it harder to integrate into user instrumentation and restricting practical application.

Y. Feng et al. developed another chromatic correction scheme using a pair of grisms (a combination of blazed grating and prism), but this previous imaging set-up cannot simultaneously capture three-plane images and was not compatible with any microscope because of the limitations of the design of key optical elements and mismatched parameters of the grating-grism combination (Y. Feng, et al. 'Optical system', UK Patent Application No. GB2504188-A, (2013)). Therefore, this rough grating-grism system was difficult to use in real world imaging applications, see section "QD grating-grism combination" for details.

2. Basic Principles of the DOE (QD Grating)

The DOE ("QD grating" in this invention) consists of a set of concentric arcs that alternate between either opaque/transparent (with regards to amplitude) or different optical thickness (with regards to phase). With consideration to a single-etch (two-level or say binary) QD grating, we define an X-Y Cartesian coordinate system as shown in FIG. 3, in which the origin is the geometric centre of the QD grating's mask pattern, the x-axis is perpendicular to the grooves, and the y-axis is parallel to the grooves in the QD grating. We note that the integer values of n are the loci number of each QD grating arc–n=0 corresponds to an arc that passes through the origin and the values of n vary from positive to negative which are opposite in sign to the direction of x-axis.

The equation of the QD grating arcs is, $$\frac{x}{d_0} + \frac{W_{20}(x^2 + y^2)}{\lambda R^2} = n \quad (5)$$

where x and y are Cartesian coordinates relative to an origin on the optical axis in the plane of the QD grating, $d_0$ is the central period of the QD grating, $W_{20}$ is the standard coefficient of defocus, $\lambda$ is the incident wavelength and R is the radius of the QD grating aperture which is centred on the optical axis. Please note that a circular aperture is assumed in equation (5), but an aperture of any shape can be utilized.

Thus the radii of the nth concentric QD grating arc $C_n$ can be written as, $$C_n = \left[\frac{n\lambda R^2}{W_{20}} + \left(\frac{\lambda^2 R}{2d_0 W_{20}}\right)^2\right]^{1/2} \quad (6)$$

Since the period of the QD grating across the aperture is not constant, this period d at a distance x from the origin along the x-axis can be given by, $$d = \frac{d_0 \lambda R^2}{\lambda R^2 - 2d_0 W_{20} x} \quad (7)$$

Therefore with x=−R the minimum QD grating period $d_{min}$ is, $$d_{min} = \frac{d_0 \lambda R}{\lambda R + 2d_0 W_{20}} \quad (8)$$

Equation (8) determines the accuracy of mask pattern in QD grating fabrication.

Here an additional phase term to incident light, which is the so-called detour phase, can be produced by the quadratic distortions in a direction perpendicular to the QD grating grooves rather than the etch depth (optical thickness) phase term produced by a normal phase grating. This local detour phase shift $\phi_m$ imposed on the wave front diffracted into order m can be given by, $$\phi_m(x, y) = m \frac{2\pi W_{20}}{\lambda R^2}(x^2 + y^2) \quad (9)$$

Equation (9) shows that the phase delay imposed on the wavefronts scatters into the non-zero diffraction orders and thus the QD grating has focussing power in these orders.

3. QD Grating-Grism Combination

Since the diffraction angle which determines the separation of the diffraction orders is wavelength dependent, for each wavelength that is input into the grating an image will be produced at a unique position. With broadband illumination, a series of monochromatic images with different positions in the non-zero diffraction orders are introduced by polychrome incident light, giving chromatically smeared images in these orders. Based on the inherent non-periodic chirps of QD grating, each incident wavelength can be manipulated to "see" an appropriate period of QD grating and identical diffraction angles with respect to different wavelengths can be obtained, and thus mitigating the chromatic dispersion. As demonstrated in FIG. 4, a customized optical system can pre-disperse the polychrome input beam and produce collimated, chromatically displaced output, such that each colour is positioned within the chirped zone plate to "see" the same QD grating structure measured in wavelength units (this pre-dispersion thus equalises the diffraction angle for each wavelength), correcting the chromatic dispersion.

Using a pair of grisms (a blazed grating combined with a prism), a chromatic correction scheme was demonstrated by Y. Feng et al. (Y. Feng, et al. 'Optical system', UK Patent Application No. GB2504188-A, (2013)). To verify the feasibility of the scheme, two commercial off the shelf (COTS) components—a 18° 8' wedge-angle prism fabricated from N-BK7 and a B270 transmission grating of 300 grooves/mm and a blaze angle of 17° 30' (both from Edmund Optics), were selected and then cemented together. Although the cementing process was not accurate enough such that the two grisms performed observable different jobs, an un-deviated wavelength of ~532 nm could be provided. See FIG. 5 for the schematic diagram of the basic design of the multi-colour three-plane imaging system, in which the two cemented grisms were mounted back to back along the optical axis (thus their gratings are opposite to, and face each other) within an assembly using optomechanical components (Thorlabs). The central wavelength of ~532 nm passed through the grism pair un-deviated, but the short and long wavelengths of the polychromatic beam were dispersed by the first grism and collimated by the second one.

However, besides the chromatic dispersion, the imaging quality of the aforementioned optical system is also affected by the blurred overlapping images produced by the re-entrant grooves of QD grating and the residual dependence of the focal length of QD grating. Here the "re-entrant grooves" represent that a greater than hemi-circular pattern of the Fresnel zone plate grooves appears in the mask pattern of the QD grating. Due to the use of non-analytically designed QD grating with re-entrant grooves (as FIG. 6 shown), the image was of poor quality although the chromatic dispersion can be effectively diminished by the grism pair (Y. Feng, et al. 'Optical system', UK Patent Application No. GB2504188-A, (2013)). Moreover, the grism system was also lacking in theoretical design, such that the optical parameters of QD grating and grism system were mismatched. Accordingly the optical path of this imaging set-up was so long (the overall optical length was ~1.3 metres, see FIG. 7) that the camera could only record one image corresponding to a single diffraction order each time, which could not even achieve the original goal of simultaneous multi-plane/multi-order imaging. In addition, this imaging system is incompatible with other techniques, i.e. microscopy, because of various errors including inaccurate alignment of the long and unstable optical path, and the defects in the fabrication of grisms and their mounts.

DESCRIPTION OF THE INVENTION

In this invention, analytically-designed QD gratings without re-entrant grooves are utilized to improve image quality. At the same time, a MATHEMATICA ray-path model of a grism system is established and thus the parameters of the grism can be theoretically customized. With the well-designed grating-grism system, our 4D multi-plane broadband imaging apparatus can be successfully combined with other techniques, i.e. microscopy, for high quality imaging.

In principle, the multiple images in an image plane perpendicular to the optical axis correspond to the diffraction orders scattered from the QD grating structure. Consequently, it is important to delicately design the QD grating structure to meet the requirements of practical applications. To utilize this type of QD grating in our 4D multi-plane imaging system, we concentrate more on the mask pattern design of the QD grating structure in addition to the basic design developed by Blanchard and Greenaway. According to equations (6) and (7), the period d maximises and the radius $C_n$ minimises at the limit when x=R, which means that $C_n$ may become negative and d may be comparatively large. Under this circumstance, one or more grooves of the QD grating will become more than a half circle (a whole concentric circle may even occur), which is regarded as the "reentry phenomenon" (as FIG. 6 shown). This reentry phenomenon might be beneficial for some applications but must be avoided in this invention. Overlapping images will be introduced by the re-entrant grooves, and the pre-dispersion produced by the grisms may not fit the grating structure, and thus the performance of our 4D imaging system will be degraded or even ruined. Here the "re-entrant grooves" represent that a greater than hemi-circular pattern of the Fresnel zone plate grooves appears in the mask pattern of the QD grating. To specialize the DOE applied in our optical system, we define the QD grating without re-entrant grooves as the non-reentry quadratically distorted (NRQD) grating.

By introducing the analytically-designed NRQD grating and grism, this invention develops a scanless 4D multi-plane broadband imaging system to improve temporal resolution without compromising spatial resolution. This technique can transfer 4D wavefront information between object and image spaces, i.e. simultaneously capturing multi-colour images from several object planes onto a single image plane, or by an alternative implementation, simultaneously recording chromatically-corrected images from a single object plane onto a few image planes. This 4D multi-plane broadband imaging system comprises various optical components as follows (FIG. 8):

one or more NRQD gratings, which are defined as QD gratings without re-entrant grooves, arranged in a multi-element optical system to produce a focal length and a spatial position associated with each diffraction order;

one or more pairs of grisms arranged to manipulate the optical path in space by wavelength for correcting the chromatic dispersion of a broadband input beam generated by the NRQD grating(s);

a lens system arranged to effectively modify the focal length of the optical system associated with each diffraction order of the NRQD grating(s) and manipulate the optical path to meet the design requirements of the grism system and, means for light detection.

The NRQD grating can be designed by a combination mask pattern which comprises more than one NRQD arc pattern such that the in-focus multi-plane (more than 3) images can be spatially arranged on a single image plane.

To obtain higher optical efficiency, NRQD gratings can be finely fabricated to achieve a multi-level (digitised) or continuous-level (analogue) profile structure.

A variety of NRQD grating types can be utilized, which consist of, but are not limited to, alternate regularly spaced grooves of different transmissivity, reflectivity, optical thickness or polarisation sensitivity.

The grisms applied in this invention can be volume phase holographic (VPH) grisms.

A grism, a blazed grating and prism combination, is analytically designed by a MATHEMATICA ray-path model for chromatic correction of the 4D multi-plane broadband imaging system. The design of a grism can be defined by its groove density, which can be specified from 100 to 800 lines per mm when the refractive index of the grism substrate is 1.4-1.5; from 100 to 900 lines per mm when the refractive index of the grism substrate is 1.5-1.6; from 100 to 1200 lines per mm when the refractive index of the grism substrate is 1.6-1.7; and from 100 to 1400 lines per mm when the refractive index of the grism substrate is greater than 1.7.

The refractive indices of the grism components, blazed/VPH grating and prism(s), can be different.

More than one pair of grisms can be utilized such that the chromatic dispersion of a broadband input beam generated by more than one NRQD grating can be corrected.

The grisms can be located at any plane as long as the theoretical pre-dispersion and re-collimation for the full incident waveband can be fulfilled.

In this invention, our 4D multi-plane broadband imaging system is compatible with multi-mode commercial microscopes including fluorescence, bright/dark field, phase contrast, differential interference contrast (DIC) and structured illumination.

By focussing a single broadband illumination source on a series of different planes, this system can also be utilized for multi-plane broadband illumination.

This technique is versatile enough to combine with various modern techniques including microscopy, astronomical optics, optical data storage, biomedical imaging, wavefront analysis and virtual/augmented reality, and will serve a large range of applications in academic research and industry.

BRIEF DESCRIPTION OF THE DRAWINGS

FIG. 3 shows a demonstration of a QD grating structure in an x-y Cartesian coordinate system.

FIG. 4 shows the pre-dispersion and collimation of incident broadband light before the QD grating can correct the chromatic dispersion.

FIG. 10 shows that, for a substrate of B270 (SCHOTT) glass, the wedge/blazed angle of a grism can be customized at a specific un-deviated wavelength. The legends mark the number of grooves of blazed gratings (lines/mm), corresponding to the joint lines from bottom to top in the graphs, respectively.

FIG. 11 shows "Yan's rainbow", which is the first time for this invention's imaging technique to successfully record the 4D broadband images of all the three diffraction orders in a single snapshot. This is accomplished without the degradation of image quality caused by the NRQD grating-induced $\lambda$ dependent focussing power.

FIG. 12 shows the false colour images from a bandpass-filtered white light source measured: (i) without chromatic correction by grisms. In this figure there is intense blurring of the image spots, which corresponds to non-central wavelengths, and is caused by the dispersion and the difference in focal lengths between wavelengths induced by the QD grating. The re-entrant grooves of the QD grating also cause a kind of blurring resulting from overlapping images. (ii) with chromatic correction by grisms. The dispersion has been effectively mitigated, but the image spots corresponding to non-central wavelengths are still blurry. This blurring is generated by the difference in focal lengths between wavelengths induced by the QD grating as well as the re-entrant grooves of the QD grating. (iii) at optimal foci for each colour without chromatic correction by grisms.

FIG. 13 shows the 4D three-plane broadband images of eGFP fluorophore with and without chromatic correction by grisms, in which white light and a series of bandpass filters were combined to simulate microscopy imaging.

FIG. 14 shows the 4D three-plane broadband microscopy images of fluorescence microspheres with and without chromatic correction by grisms.

FIG. 15 shows the bright field 4D three-plane broadband microscopy images of HeLa living cells. The separation between each in-focus image ($\Delta z$, see equation (2)) is 2.3 µm and the bandwidth is 525±39 nm.

FIG. 16 shows that, by combining the phase contrast imaging mode with multi-plane imaging principles, an NRQD grating with this type of mask pattern can be utilized for 4D three-plane broadband phase contrast microscopy imaging.

FIG. 17 shows that, for a substrate of fused silica, the wedge/blazed angle of a grism can be customized at a specific un-deviated wavelength. The legends mark the number of grooves of blazed gratings (lines/mm), corresponding to the joint lines from bottom to top in the graphs, respectively.

FIG. 18 shows that, for a substrate of N-BAF10 (SCHOTT) glass, the wedge/blazed angle of a grism can be customized at a specific un-deviated wavelength. The legends mark the number of grooves of blazed gratings (lines/mm), corresponding to the joint lines from bottom to top in the graphs, respectively.

FIG. 19 shows the schematic of the mask pattern of an NRQD grating with "crossed" structure, by which the images of nine separate object planes can be simultaneously obtained and split across a single image plane.

FIG. 20 shows that, for a substrate of N-SF11 (SCHOTT) glass, the wedge/blazed angle of a grism can be customized at a specific un-deviated wavelength. The legends mark the number of grooves of blazed gratings (lines/mm), corresponding to the joint lines from bottom to top in the graphs, respectively.

IMPLEMENTATION DETAILS AND EXAMPLES

Figure 1:
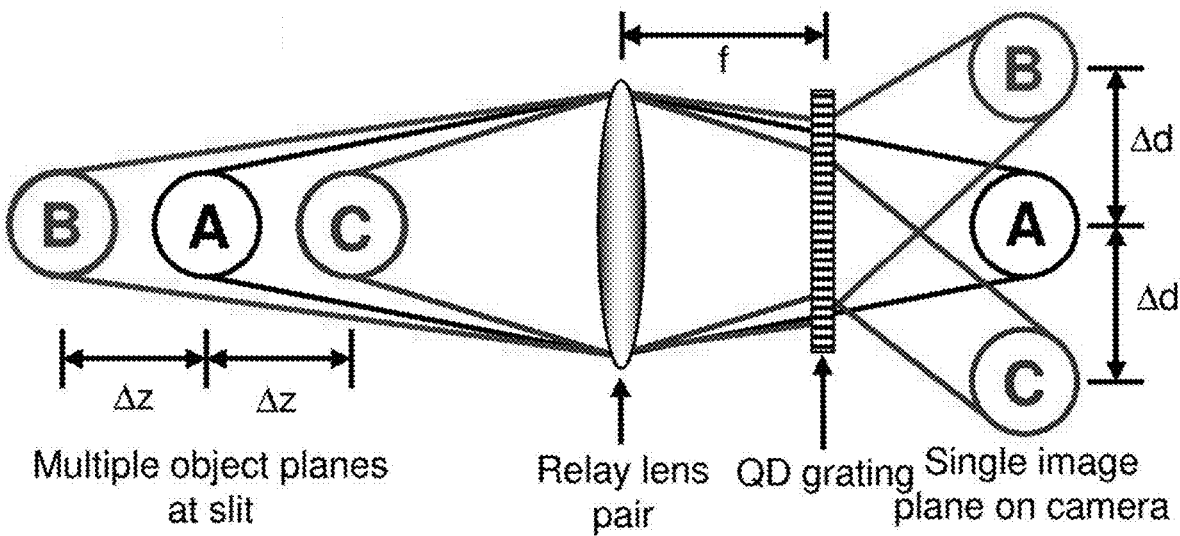
FIG. 1 shows the schematic of the basic design of the 3D narrow-band imaging system.
Figure 2:
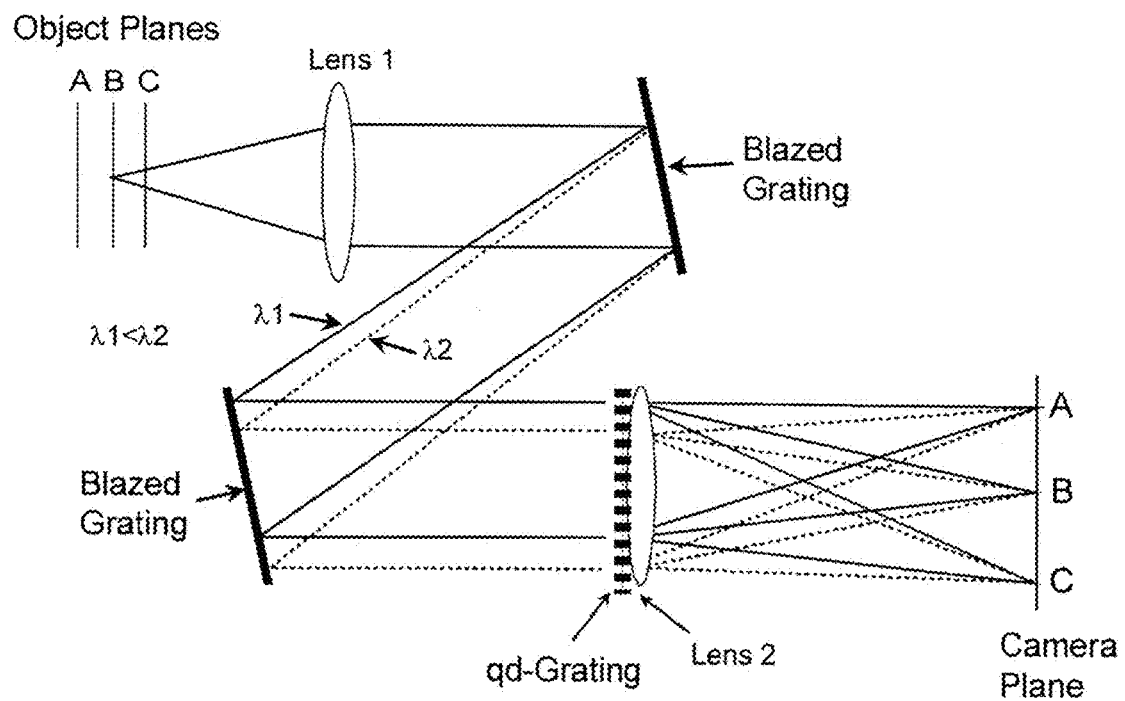
FIG. 2 shows the schematic diagram of an early chromatic correction scheme for pre-dispersion of light before it is incident on the QD grating.

The main challenges of this invention are the analytical design of the NRQD grating and the grism, and the well-matched parameters of an NRQD grating-grism combination. In practice, to avoid re-entrant grooves and thus overlapping images, we must set appropriate values of the central period $d_0$ and the defocus level $W_{20}$. Here the central period determines the diffraction angle and therefore the separation of images recorded on the image detector (i.e. camera). Then a lens system is taken into account, accompanied with other parameters of the NRQD grating, i.e. incident waveband, radius, refractive index of substrate and etch depth, with which a relay design of NRQD grating-lens combination can be roughly established. Based on this grating-lens combination model, the parameters of the grism are carefully considered, such that the function of chromatic control can be fulfilled and the relay design of an NRQD grating-lens-grism combination can be optimized. Finally, to obtain an "optimal" relay design, a few rounds of parameter optimization are always performed. During this process, re-entrant grooves may occur and the minimum period $d_{min}$ (equation (8)) of the NRQD grating may become too small, resulting in either a flaw in the design of the NRQD grating or higher complexity of grating fabrication. Therefore, it is essential to perform a final check on the two factors of $d_0$ and $W_{20}$ before carrying out simulation experiments with the "optimal" parameters. We note that, applying similar principles, variations of the so-called "optimal" relay design are always available in practice.

Based on the theories of Fraunhofer diffraction and Fourier optics, a 2D mathematical model of the NRQD grating is established, by which we could deeply explore the imaging principles of NRQD grating as well as improve the design of NRQD grating (i.e. design of mask pattern and fabrication parameters including an optimal etch depth). Following the Zernike polynomial, a complicated MATLAB program was developed for plotting the mask pattern of a QD grating. However, the plotting process was opaque. This opacity, given the complexity of the algorithm and its corresponding long run time (normally more than 10 hours), means that the parameters we start the plotting with may be inappropriate such that we have to check for re-entrant grooves after the calculations are completed. These shortcomings make tuning the grating design parameters difficult, reducing this algorithm's flexibility with regards to grating design. This algorithm also has the limitation that only "arc" grooves, rather than any other combined structures such as "crossed" grooves, can be generated. This inability to generate crossed grooves hinders the development of improved grating designs. In this invention, based on our 2D mathematical model of NRQD grating, we have developed codes using both MATHEMATICA and MATLAB software for optimizing the parameters of plotting the mask pattern. Then with these optimal parameters, a plotting program developed by AUTOCAD software is applied to "draw" the mask pattern of the NRQD grating, such that the defects of the mask layout may be easily found during the visible plotting procedure. As well, the processing time of the mask-generation is significantly reduced; only a few minutes for an experienced AUTOCAD user. Furthermore, the mask layout of either a single NRQD grating or a combination of two or more NRQD gratings can be flexibly generated and manipulated to meet further imaging requirements. It is known that the more real gratings introduced, the more energy lost by the optical system. In comparison with overlaying two or more NRQD gratings upon each other for simultaneous 9- or more-plane imaging, a single mask layout with an arbitrary combination pattern can be produced and therefore 9 or more images can be efficiently obtained upon implementation of this invention. In any case, the chromatic dispersion induced by more than one NRQD grating or a single NRQD grating with its combination mask pattern, can be corrected by more than one pair of grisms.

Figure 9:
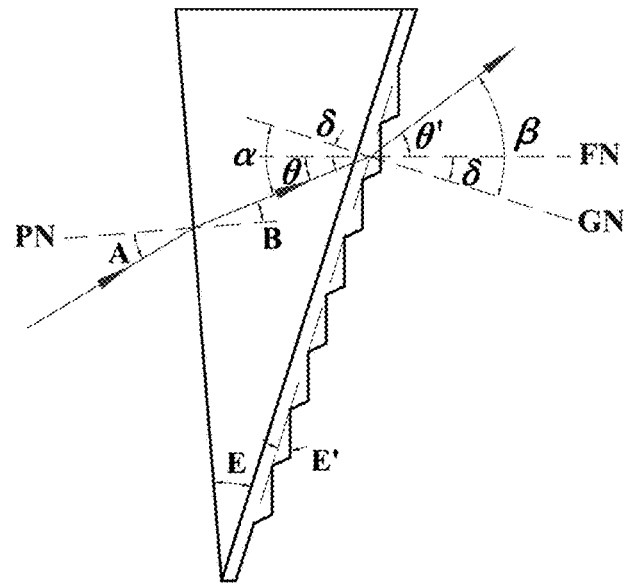
FIG. 9 shows the ray-path model of a single grism, showing ray paths from air to grism, and back to air (the blazed order is +1 in this case).

Our ray-path model of a single grism is based on Traub's design (W. A. Traub, 'Constant-dispersion grism spectrometer for channeled spectra', Journal of the Optical Society of America A 7(9), 1779-1791 (1990)). As FIG. 9 illustrated, a ray indicated by the arrow lines successively enters the prism at angle A, refracts, reaches the grating at angle α, and finally diffracts into the air at angle β (+1st order here), where the dashed lines represent the directions of the prism normal (PN), the grating normal of the outer face (GN) and the facet normal (FN). The sign convention is that, measuring from the normal to the incident surface, counterclockwise angles are positive. Such a grism can be obtained by manufacturing a grating structure onto one face of a prism. At this stage, we only concentrate on a simple and practical grism design, rather than demonstrating the full descriptions of the mathematical ray-tracing model.

For the grism model shown in FIG. 9, the diffraction angle β can be given by, $$\beta = \arcsin\left(n\sin\left(\arcsin\left(\frac{\sin A}{n}\right) + E\right) - \frac{m\lambda}{d}\right) \quad (10)$$

where m is the number of the diffraction order, λ is the incident wavelength, d is the grating period, and n is the refractive index of the grism substrate. The positive orders diffract clockwise with respect to the zeroth order, whereas the negative orders diffract counterclockwise. Please note that in equation (10) the refractive index n is assumed to be the same for the grism components, a grating and a prism. However, these components can have different refractive indices. Using the grism ray-path model, the refractive index of each component can be easily changed.

Based on the ray-path model of the grism system, the parameters of the grism such as the wedge/blazed angle and the number of grooves of the blazed grating can be calculated using the desired glass type of the grism substrate and the un-deviated wavelength. We have a set of pre-calculated tables of such parameters in our figures corresponding to certain glass types and un-deviated wavelengths. The grism parameters can be optimized according to the design of the NRQD grating and the required properties of the optical system. A ray-tracing simulation in Zemax software is applied to verify that the parameters of the NRQD grating and grisms are well matched, and that the performance of the optical system is optimized. Consequently, a customized 4D multi-plane broadband imaging system based on NRQD grating and grism is established. In principle, grisms utilized in an imaging system may be of any suitable type without compulsorily identical design, and their positions in optical relay system may be arbitrary as long as the amount of pre-dispersion required for sufficient chromatic correction can be provided.

In this invention, we have built a set of mathematical models based on MATHEMATICA and MATLAB software for the design of key optical elements and the NRQD grating-grism combination system. Under the guidance of these theoretical models, the optical system can be customized for a variety of applications and is versatile enough to combine with various modern techniques including microscopy, astronomical optics, optical data storage, biomedical imaging, wavefront analysis and virtual/augmented reality. Here we will demonstrate some practical examples for 4D multi-plane broadband imaging, which, by an alternative implementation, can also be utilized in capturing broadband illumination/images from a single object plane on a few image planes. A skilled person will appreciate that variations of the disclosed arrangements are possible without departing from the invention. Accordingly, the following description of the specific embodiments is made by way of example only and not for the purposes of limitation. It will be clear to the skilled person that minor modifications may be made without significant changes to the operation described.

Example 1: Simulated 4D Three-Plane Broadband Imaging Tests

We have demonstrated the principles and the design of the 4D multi-plane broadband imaging system. To test the quality and effectiveness of this approach for practical use, some simulated 4D three-plane broadband imaging experiments were performed, such that both our theoretical models and optical set-up can be qualitatively verified.

Figure 5:
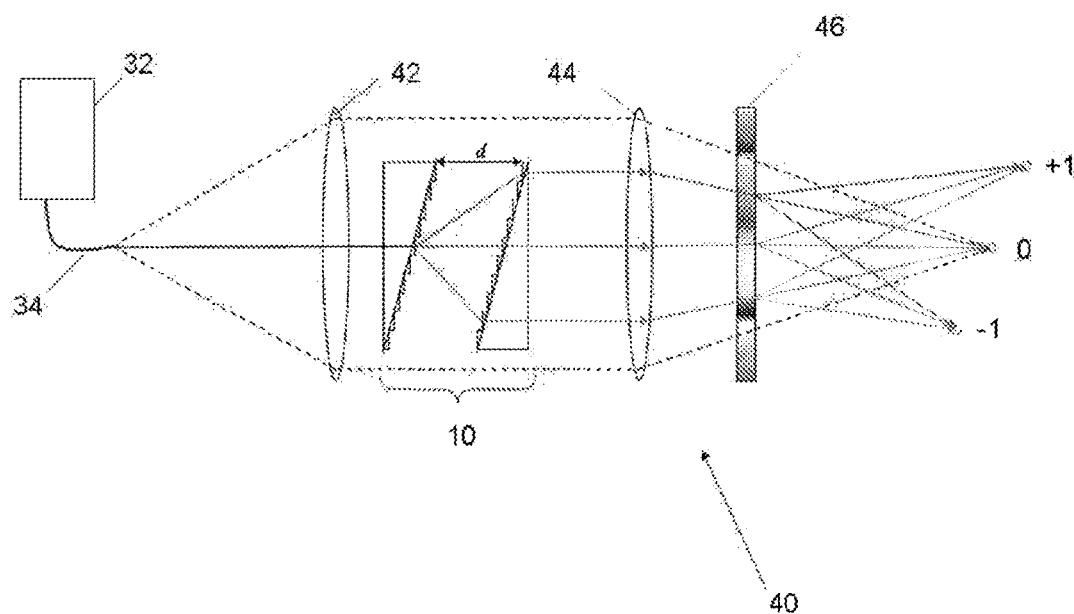
FIG. 5 shows the schematic of the basic design of a multi-colour imaging system based on a QD grating and a grism pair. As described in patent GB2504188-A, the imaging system (40) comprises a dispersive device (10) optically aligned between a pair of achromatic lenses (42), (44), a polychromatic light source (32), a QD grating (46), a multimode fibre (34) and a CCD detector (not shown).

A continuum white laser (Fianium supercontinuum light source SC450-PP-HE, operating wavelength ranges from approx. 450 nm to >1750 nm) fed through a single mode optical fibre (Thorlabs P1-488PM) was utilized to mimic imaging environments. Here a simple optical set-up we used before (FIG. 5) was built. A pinhole with a diameter of approximately 3 mm was used as an aperture stop, and two achromats with an identical focal length of 250 mm were spaced 200 mm apart and operated as a unit magnification relay system with an effective focal length of ~208 mm. In this case the NRQD grating, which is fabricated on fused-silica substrate with a refractive index of ~1.46, has a nominal axial period (i.e. central period) of 50 µm, a curvature $W_{20}$ of 50 waves and radius 10 mm, thus has ±1898 mm focal lengths in the first diffraction orders at 527 nm incident wavelength. When the NRQD grating was placed 208 mm from the second principal plane (~42 mm from the second achromat) of the compound imaging system, equal magnification images were obtained in each diffraction order, providing simultaneous three-plane imaging due to the order dependent focussing power introduced by the NRQD grating.

A ray-path model, in which a pair of identical, back to back grisms (their gratings are opposite to, and face each other) are applied, has been established for analysing the selection of grism parameters. According to this ray-path model, the customized parameters of the grism can be described as a set of tabulated functions, from which the wedge and blazed angles and the number of grooves of the blazed grating for certain optical glass at a specific un-deviated wavelength, can be estimated/selected based on the practical requirements of the optical system. In this case, the customized grism is made from Schott B270 substrate with a refractive index of ~1.53 and has a squared size of 25 mm×25 mm. Based on the tabulated functions shown in FIG. 10, when the un-deviated wavelength of the grism is 527 nm, both the wedge and blazed angles (corresponding to E and E' in FIG. 9, respectively) of 17.5° and 300 grooves/mm for the blazed grating can be selected. Here the grating structure can be fabricated onto the hypotenuse face of a right-angle prism, and the wedge angle of the prism and the blazed angle of the grating are identical. In a simple optical system similar to the one shown in FIG. 5, our customized grism pair can produce a collimated beam with chromatic shear from a collimated polychrome input, and the lateral shear between the polychrome components in the output beam can be controlled by varying the separation between the grisms. Note that only the spacing between the two grisms is relevant, not their absolute position between the achromat pair.

Before performing our imaging tests, we need to define an appropriate physical separation of the images on the image plane (the sensor chip of the camera) to avoid the multi-plane images overlapping with each other, and also make good use of the sensor chip. Due to the physical size of the camera sensor chip, we need to arrange the multi-plane (2~9) images to fit onto this chip. In this case, the sensor chip of our camera has a 2048×2048 array of 6.5 µm square pixels (Andor Zyla 4.2 sCMOS), therefore the size is 13.3 mm×13.3 mm. For telecentric imaging (1:1 magnification of the optical system) we built a simultaneous three-plane broadband imaging system by using the selected parameters shown above. At normal incidence, when the design wavelength is 527 nm and the central period of the NRQD grating is 50 µm, the diffraction angle of the first orders is about 0.6°. Accordingly, a centre separation of 2.18 mm between the three images (0th and ±1st orders) is achieved which might be regarded as the minimum separation between each image without overlapping. Thus 3×2.18 mm=6.54 mm (~50%) of the camera chip width will be occupied by these images, which presents a well-designed optical system.

To assess the performance of the 4D multi-plane broadband imaging system over the entire visible spectrum, a high-power fibre continuum source (Fianium SC450-PP-HE) filtered by a set of 20 nm bandpass filters (Thorlabs) with central wavelengths from 450 nm to 650 nm in 20 nm steps was implemented. Thus eleven wavebands, each with a 20 nm bandwidth, can be simulated. The different object distances corresponding to the three object planes were achieved by varying the fibre light source. Each greyscale image captured by the sCMOS camera (Andor Zyla 4.2) was normalized for equal total photon flux at each waveband using ImageJ software, and then falsely coloured using MATHEMATICA software by means of calculating the RGB value of each central wavelength, normalizing each image for compatibility with RGB, creating coloured images using R, G and B scalers, and compositing a coloured image of a single central wavelength. Finally, the false-colour images of all the eleven wavebands (central wavelengths from 450 nm to 650 nm in 20 nm steps) were combined together and thus formed a multi-colour image. Since this composite image presents an impressive phenomenon of rainbow hues, the inventor YF labels it following her name—Yan's rainbow, which is supposed to specify the multi-plane, multi-colour images introduced by the NRQD grating with and without grism correction. The "rainbow" images in greyscale format are shown in FIG. 11.

Figure 6:
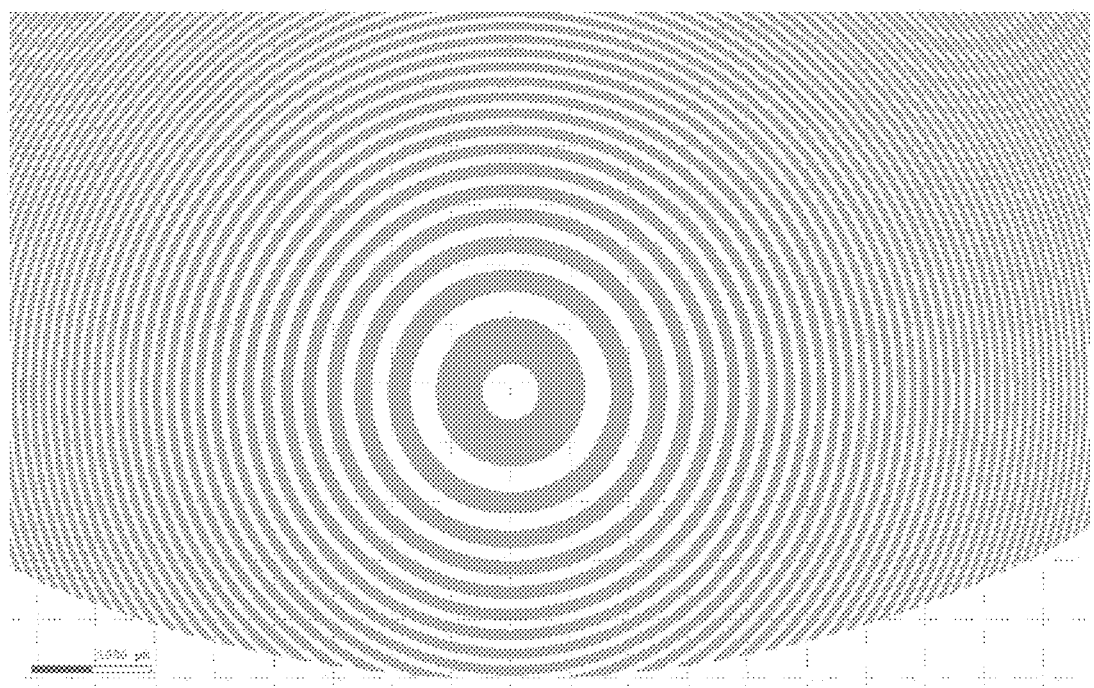
FIG. 6 shows the re-entrant grooves in a partial view of the mask pattern of the QD grating used in the UK patent GB2504188.
Figure 7:
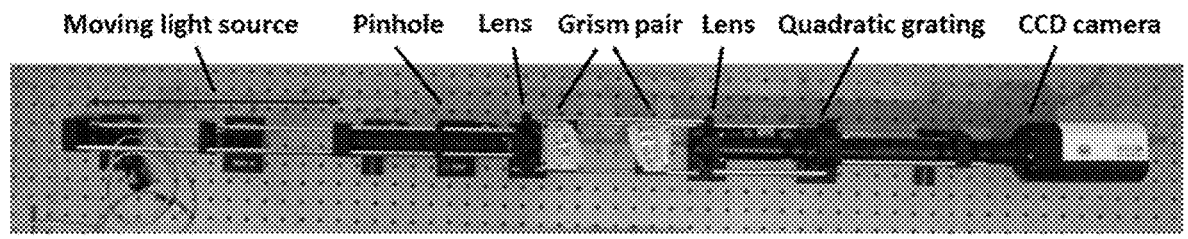
FIG. 7 shows the long optical path of a QD grating and grisms based imaging system.
Figure 8:
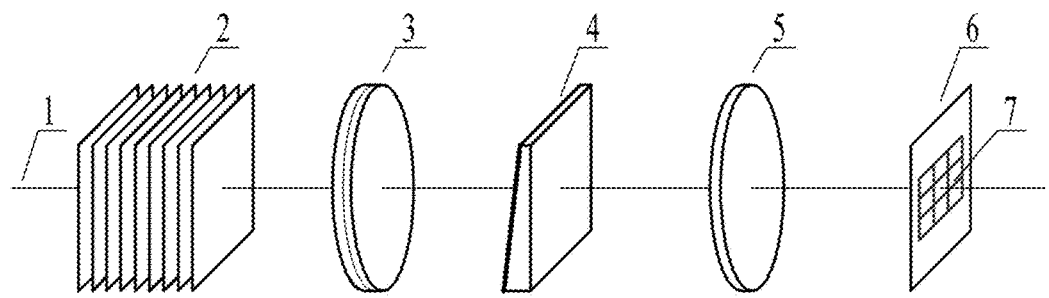
FIG. 8 shows the schematic of the four-dimensional (4D) multi-plane broadband imaging system. The imaging system comprises: one or more non-reentry quadratically distorted (NRQD) gratings (5) which can produce a focal length and a spatial position corresponding to each diffraction order, thus simultaneously transmitting wavefront information between multiple object/image planes (2) and a single image/object plane (7); a grism system (4) which can limit chromatically-induced lateral smearing by creating a collimated beam in which the spectral components are laterally displaced; a lens system (3) which is configured to adjust the optical path; and the optical detector(s) (6). In an optical system, the multiple object/image planes (2), the lens system (3), the grism system (4), the NRQD grating(s) (5), the optical detector(s) (6) and the single image/object plane (7) are located on the same optical axis (1).

Yan's rainbow demonstrates the first successful use of our 4D imaging approach based on NRQD grating and grism for simultaneous multi-plane broadband imaging. In comparison with the similar optical design Y F et al. proposed in 2013 (Y. Feng, et al. 'Optical system', UK Patent Application No. GB2504188-A, (2013)), a few advantages of our well-designed optical elements as well as the imaging system have been revealed by Yan's rainbow. First, our current system can be implemented for simultaneous three-plane (in this case) imaging with chromatic correction, whereas the old system Y F et al. developed in 2013 can only record a single-plane image corresponding to one of the three diffraction orders in each snapshot (see FIG. 12). Second, our system has successfully mitigated the smearing of non-central wavebands (where the central waveband is 520 nm to 540 nm) induced by the dependent focussing power of the NRQD grating through the appropriate parameters of NRQD grating and grisms, rather than compensating for the focal dependence by re-focussing the camera for each chromatic component as Y F et al. did before (FIG. 12 (iii)). Without repositioning the fibre light source at each waveband to compensate for the NRQD grating induced focal dependence, the imaging system we built in this case was only focussed for the un-deviated/central wavelength of ~530 nm in the first three diffraction orders, with and without grism correction. It is evident that, in Yan's rainbow, the image quality of the non-zero diffraction orders of each non-central waveband is effectively improved, whereas the zeroth order image is unaffected by NRQD grating and grisms (except the lower photon flux). Furthermore, although the chromatic dispersion of non-central wavebands has been mitigated, the spots shown in FIG. 12 (ii) are still smeared. Unlike Yan's rainbow, the image quality in this figure is affected by the blurred overlapping images produced by the QD grating's re-entrant grooves (see FIG. 6) and the residual λ dependence of the focal length. And it is not practical to adjust for the linearly wavelength dependent focussing power of the QD grating by repositioning the light source at optimal foci for each colour as illustrated in FIG. 12 (iii). Consequently, to achieve effective 4D multi-plane broadband imaging, the appropriate QD grating(s) without re-entrant grooves (thus NRQD grating(s)) is(are) essential, and a well-designed optical system based on NRQD grating(s), grisms and achromatic doublets should be mathematically modelled, verified, and optimized.

We note that, since the rainbow experiment was performed to simulate the function of 4D multi-plane broadband imaging technique, a relatively small grism separation of 140 mm was selected in this case, by which chromatic correction for only a ~100 nm bandwidth could be completed according to the mathematical model (here the incident bandwidth is 220 nm). Hence a residual chromatic dispersion of the first orders still occurred, as shown in FIG. 11. In fact, chromatic correction for a broader waveband can be achieved by enlarging the grism separation. A more delicate mathematical model of 4D multi-plane broadband imaging system is in progress, which takes more optical aberrations into account, i.e. spherical aberration and coma.

To further demonstrate the effectiveness of our 4D multi-plane broadband imaging system, we took a simulation test of fluorescence microscopy imaging. As an illustration we have chosen to model eGFP fluorophore, which is widely used in cell biology. Without involving any microscope, we simulated the 4D multi-plane broadband microscopy imaging of fluorophore by modifying the bandpass filtered white light (i.e. rainbow experiment for certain waveband) and simply summing a series of images spanning the fluorophore emission bandwidth (from 480 nm to 600 nm in 20 nm steps), with an appropriate weighting to mimic the fluorophore emission spectrum. The optical system was focussed and aligned for the filter that best matched the peak fluorophore wavelength of 520 nm. Due to the optimization of the optical system and the lack of blurring produced by the QD grating's re-entrant grooves, we may ignore the difference in focal length between wavelengths induced by our NRQD grating. With regards to that fact, we chose to fix the source position for the fluorophore, and only the zeroth order image was adjusted in focus. A series of 20 nm bandwidth images were then recorded using a set of spectral filters covering the fluorophore emission spectrum, and the spots corresponding to the individual filters (wavebands) were clearly visible. To process these narrow band images, the total flux for each filter (waveband) was first normalized to the total flux at the peak emission wavelength and then weighted to simulate the fluorophore emission spectrum by the appropriate factor. The composite three-plane images for the simulated eGFP fluorophore, with and without grism in place, are shown in FIG. 13. We see that the three-plane broadband image of the simulated eGFP fluorophore can be simultaneously recorded, although a minor residual chromatic dispersion occurs in the red wavebands (the top image in FIG. 13).

We have successfully developed the 4D multi-plane broadband imaging system based on NRQD grating and grism, which, for the first time, achieves chromatically-corrected, high-efficiency, easy-to-use, and simultaneous three-plane imaging. Due to the high temporal resolution, this optical system could be applied to measure some dynamic procedures, such as single particle tracking. The simulated tests, which are performed in the same condition as practical imaging (i.e. same incident waveband and photon energy distribution), may be taken as a reference for reconstructing the accurate 4D images from multi-plane images such that the distortion of non-zero order images can be corrected by post-image processing techniques.

Example 2: 4D Three-Plane Broadband Multi-Mode Microscopy Imaging

Although some modern optical microscopy techniques have achieved considerably high spatial resolution, specimen information can only be obtained from a single focal plane in each snapshot which is 2-dimensional (2D). Biological samples, i.e. living cells, are three-dimensional (3D) and constantly changing, so the observation of 3D biological specimens and thus the analysis of volume structures have been increasingly needed for basic biological research as well as clinical diagnosis and therapy. Most of the current 3D microscopy imaging techniques use time-consuming methods, such as scanning the depth of a sample, leading to severe limitations for imaging optically sensitive samples and exploring biosamples dynamics, especially when fast dynamical processes are required to be followed. And unfortunately, the spatial and temporal resolutions are mutually opposed to one another, and the temporal resolution is always sacrificed for seeing fine structural details. Therefore, new temporal resolution imaging techniques are required in order to record 3D dynamics in high temporal frame rates without compromising spatial resolution.

In this invention, we have built a high temporal resolution, high efficiency and easy-to-use 4D multi-plane broadband imaging system, which is versatile enough to combine with various modern techniques including microscopy, astronomical optics, optical data storage, biomedical imaging, wavefront analysis and virtual/augmented reality. Here the efficiency of the grating is defined as the energy flow of light diffracted into the orders being measured, relative to the energy flow of the incident light. The efficiency of an NRQD grating can be optimized by high-precision fabrication (i.e. multi-etch), by which a multi-level (digitised) or continuous-level (analogue) profile structure can be obtained. According to the various requirements of imaging applications, a variety of NRQD grating types can be utilized, which consist of alternate regularly spaced grooves of different transmissivity, reflectivity, optical thickness or polarisation sensitivity. By using customized grisms with optimized parameters instead of a narrow bandpass filter, the chromatic effects of an NRQD grating can be efficiently controlled and the light flux of an imaging system can be significantly improved. In this section, we will demonstrate a few practical applications in 4D multi-plane broadband microscopy imaging by using our optical set-up. The imaging apparatus can be easily appended to the camera port of a commercial microscope to simultaneously record 4D multi-colour images from several object planes and can be used in various imaging modes, e.g. fluorescence, brightfield, phase-contrast, differential interference contrast (DIC), structured illumination, etc. Without the need of a narrow bandpass filter and complicated adjustment of the optical system, our 4D multi-plane broadband microscopy imaging system is well suited to biological applications, in which there is always a very limited amount of light available for imaging and the object to be measured constantly changes. It is also compatible both with particle localization and tracking and with full-field, 3D, deconvolution-based specimen reconstructions from z-stacks. Z-plane separations of multi-plane images can be varied from arbitrarily small to many microns.

4D Three-Plane Broadband Microscopy Imaging of Fluorescence Microspheres

Since the full bandwidth of the emission spectrum of fluorophores can be accessed using 4D multi-plane broadband imaging technique, 4D multi-plane fluorescence microscopy imaging becomes an important application of this technique. Combining our 4D multi-plane broadband imaging technique with microscopy, a simple and compact optical apparatus has been built and appended between microscope and camera, tracking and recording the 4D optical information of specimens. To demonstrate the optical performance of this apparatus, a 4D three-plane broadband microscopy imaging test of fluorescence microspheres was performed.

First, a fluorescence microspheres sample for the imaging test was well-prepared. The coverslips (BRAND, 470820) were treated with acetone and 1M NaOH solution successively, in which each treatment was performed in an ultrasonicator for 30 min, followed by thoroughly rinsing with deionized water for several times (>2, sonicate when necessary). These clean coverslips were then dried with nitrogen. And due to the good viscosity and optical properties, Polyvinyl Acetate (PVA, 81381 Sigma-Aldrich) was chosen as the carrier material of fluorescence microspheres. 30% PVA aqueous solution was prepared by dissolving the powder in water heated to about 100° C. under stirring. Then the 1:10 diluted suspension of fluorescence microspheres (Invitrogen, F8827, 2 μm, 505/515) was mixed with PVA solution with a ratio of 1:10, along with repeated sonicate, vortex mixer and 70° C. water bath which avoided beads clustering and allowed sufficient mixing of beads and PVA solution. Finally, the well-dispersed fluorescence microspheres with PVA solution were gently dipped onto the cleaned coverslips (~100 μl per sample, spin coating may be applied if a film with even thickness was required) and left in a 45° C. oven for a few minutes for drying. With a quick check by microscope, we saw that the fluorescence microspheres were monodispersed and quasi-stochastic uniformly immobilized in PVA gel. The samples were kept in dark place to avoid photolysis (although it rarely happened).

Imaging experiments were carried out on an Olympus IX73 microscope set-up (100× oil-immersion objective) that was configured to simultaneously image three object planes of the specimen onto a single image plane with chromatic correction. To fully demonstrate the emission spectrum of fluorescence microspheres, our NRQD grating-grism combination system was designed to give an un-deviated (central) wavelength at the peak of fluorophore's emission spectrum. Based on the optical parameters applied in Example 1, the relay design of this 4D three-plane broadband fluorescence microscopy imaging system was established, with the separation between the three object planes ($\Delta z$) of 2.3 μm. This was achieved by placing the NRQD grating at Fourier plane of the lens system, but the absolute positions of the grisms were not strictly defined. The sample of fluorescence microspheres was excited by a laser source with a wavelength of 473 nm, and a bandpass filter (Thorlabs, FB550-40) was implemented on the emission light and generated a spectrum bandwidth ($\Delta \lambda$) of 80 nm, which corresponded to a grism separation of 108 mm for chromatic correction according to our mathematical model. The images were captured by the sCMOS camera (Andor Zyla 4.2) with an exposure time of 50 ms and then were processed by the software ImageJ. In the images of the first three orders before and after chromatic correction shown in FIG. 14, we see that the three planes of fluorescence microspheres can be simultaneously imaged in a single snapshot and the chromatic dispersion of first diffraction orders has been effectively corrected by the grism pair.

In this invention, our 4D multi-plane broadband microscopy imaging technique can also be applied for the simultaneous multi-plane imaging of multiple fluorophores. By using a set of NRQD gratings (each designed for a different wavelength), grism pairs and dichroic mirrors, multi-plane in-focus images of multiple fluorophores can be simultaneously recorded on a few separate monochrome cameras. An example we presented before shows that (Y. Feng, et al. 'Chromatically-corrected, high-efficiency, multi-colour, multi-plane 3D imaging', Optics Express 20(18), 20705-20714 (2012)), if the dichroic mirror directs emission from a short wavelength emission fluorophore to one camera and the other camera sees a long wavelength fluorophore, these fluorophores can both be imaged separately but simultaneously in 3D on the two cameras. After, a third fluorophore at a central wavelength can be chosen such that the light from this fluorophore is detected in 3D on both cameras. Then the coincident images on the two cameras are clearly due to the mid-wavelength fluorophore and, once these coincidences have been established, the remaining images on each camera can be assigned to the appropriate short or long wavelength fluorophore. Similar to the principles above, if more than two NRQD gratings and more than two pairs of grisms are utilized, and if the total emission is split by a few dichroic mirrors, more emission fluorophores with different wavebands can be simultaneously and multi-plane imaged on a set of separate monochrome cameras. Since each fluorophore is simultaneously and multi-plane imaged, it is possible to study dynamic interactions between different cellular components in 4D with accurate chromatic correction.

4D Three-Plane Broadband, Bright Field Microscopy Imaging of Living HeLa Cells

HeLa cells were cultured in DMEM (Hyclone, U.S.A.) containing 10% fetal bovine serum (Hyclone, U.S.A.) in a humidified 5% $CO_2$ atmosphere at 37° C. The living cells, grown in a 35 mm glass-bottom dish (Shengyou Biotechnology), were then rinsed several times (normally 3 times) with PBS buffer and incubated in fresh medium for bright field microscopy imaging. The optical set-up remained almost the same as that of the simulated experiments illustrated in Example 1, except replacing an NRQD grating with a smaller central period of 30 μm and applying a grism separation of 176 mm. In addition, an output spectrum bandwidth ($\Delta \lambda$) of 78 nm was obtained by another bandpass filter (Thorlabs, MF525-39). Then the HeLa cells were illuminated by an unfiltered white light halogen lamp for three-plane bright field microscopy imaging using Olympus IX73 microscope set-up (100× oil-immersion objective).

FIG. 15 shows the 4D three-plane broadband bright field microscopy images of HeLa cells. The three images appear to be significantly different and the shape of cells in non-zero order images looks undistorted. Since the separation between the three object planes $\Delta z=2.3$ μm is so large that the imaging depth exceeds the axial size of the cell, these object planes should be regarded as in-focus although the images are not sufficiently sharp. Further imaging experiment(s) will be performed using a smaller separation ($\Delta z$) of ~1 μm, which can capture more details of inner structures of the cells.

4D Three-Plane Broadband Phase Contrast Microscopy Imaging

Our 4D multi-plane broadband imaging system provides a low-cost and flexible approach to the implementation of image capture involving several different imaging modes, i.e. bright/dark-field, fluorescent, phase-contrast, differential interference contrast (DIC) and structured illumination. In this case, a curved and partly dislocated NRQD grating structure is utilized to combine the 4D multi-plane broadband imaging technique with the phase contrast microscopy imaging mode, as FIG. 16 shows (Y. Feng, et al. 'Multimode microscopy using diffractive optical elements', Engineering Review 31(2), 133-139 (2011)). With a displacement of one quarter grating period with reference to the outer NRQD grating structure, a phase shift of $$\frac{\pi}{2}$$

for the +1st order and $$-\frac{\pi}{2}$$

for the −1st order can be produced, which either retards or advances the phase of the diffracted reference beam, dependent on the diffraction order (the zeroth order is unaffected).

In this case, the NRQD grating, which is fabricated on fused-silica substrate with a refractive index of ~1.46, has a nominal axial period of 32 μm, a curvature $W_{20}$ of 150 waves and a radius of 10 mm, and thus has ±538 mm focal lengths in the first diffraction orders at 620 nm central wavelength. Based on the tabulated functions (as shown in FIG. 17) obtained by our ray-path model of the grism system, when the customized grism is made from fused silica substrate with a refractive index of ~1.46 and the un-deviated wavelength of the grism is 620 nm, both the wedge and blazed angles (corresponding to E and E' in FIG. 9, respectively) of 15.7° and the number of grooves of the blazed grating of 200 grooves/mm, can be selected. Two achromats with an identical focal length of 300 mm were spaced 250 mm apart and operated as a unit magnification relay system with an effective focal length of ~257 mm. A bandpass filter (Thorlabs, MF620-52) was implemented to generate an output spectrum bandwidth (Δλ) of 104 nm, which corresponded to a grism separation of 189 mm for chromatic correction. Based on the above relay design and applying a 100× oil-immersion objective, the separation between the three in-focus object planes (Δz) was 12.3 μm. This optical system enables the 4D multi-plane broadband microscopy imaging/tracking of transparent and rapidly-moving objects (i.e. human sperm motility measurement) in a considerable large volume, which may offer new insights into biodynamics.

4D Three-Plane Broadband Differential Interference Contrast (DIC) Microscopy Imaging In this case, our 4D multi-plane broadband imaging system is implemented for the differential interference contrast (DIC) microscopy imaging mode. The imaging experiment can be performed on an Olympus IX73 microscope set-up which is configured to simultaneously DIC image three object planes on to a single image plane with chromatic correction.

Here the NRQD grating, which is fabricated on fused-silica substrate with a refractive index of ~1.46, has a nominal axial period of 30 μm, a curvature $W_{20}$ of 50 waves and a radius of 10 mm, and thus has ±2088 mm focal lengths in the first diffraction orders at 479 nm central wavelength. Based on the tabulated functions (as shown in FIG. 18) obtained by our ray-path model of the grism system, when the customized grism is made from N-BAF10 (SCHOTT) substrate with a refractive index of ~1.68 and the un-deviated wavelength of the grism is 479 nm, both the wedge and blazed angles (corresponding to E and E' in FIG. 9, respectively) of 44.8° and the number of grooves of the blazed grating of 1000 grooves/mm, can be selected. Two achromats with an identical focal length of 150 mm were spaced 130 mm apart and operated as a unit magnification relay system with an effective focal length of ~132 mm. A bandpass filter (Thorlabs, MF479-40) was implemented to generate an output spectrum bandwidth (Δλ) of 80 nm, which corresponded to a grism separation of 108 mm for chromatic correction. Based on the above relay design and applying a 100× oil-immersion objective, the separation between the three in-focus object planes (Δz) was 839 nm. By configuring the objective Nomarski prism and/or a quarter-wave plate (when necessary), the contrast of multi-plane images can be adjusted. In comparison with phase contrast microscopy imaging mode, DIC will provide finer details of the edge structures in three-plane images without artificial halos.

SUMMARY

The combination of 4D multi-plane broadband imaging system with various microscopy imaging modes has formed a solid proof of the effectiveness and the practical applicability of our imaging technique. Due to the simple, easy-to-use and compact optical set-up, our imaging system can either be built as an optical attachment which is fully compatible with a commercial microscope and standard camera system, or be integrated into the optical path of a microscope, and hence customizing a novel microscope.

Example 3: 4D Nine-Plane Broadband Imaging

The NRQD grating we discussed above is made up of a series of concentric arc grooves (less than hemi-circular) with varying radii, by which the detour phase of incident light can be produced, allowing images of three separate object planes to be simultaneously obtained and split across a single image plane. To record images of more planes (up to nine) in a single snapshot, the mask pattern of an NRQD grating can be designed as an orthogonal combination of two mask patterns of "arc" structure (see FIG. 3 for the "arc" structure), which is the so-called "crossed" structure (as illustrated in FIG. 19). When the light flux loss does not have a critical effect on the imaging performance of the optical system, a "crossed" NRQD grating can be replaced by a superposition of two "arc" NRQD gratings that are placed at orthogonal orientation and have the same design as the corresponding "arc" structures of the "crossed" NRQD grating. However, the optical efficiency is one of the most important factors that affects the imaging performance of our optical system. To make effective use of the broadband spectral energy and thus achieve simultaneous nine-plane broadband imaging in high efficiency, we may have to focus on the combination mask design of "crossed" NRQD grating and a simple chromatic correction scheme.

By optimizing the grooves structure of a "crossed" NRQD grating (i.e. curvature, period and etch depth) and centre positions of the two sets of concentric arcs, energy-balanced multi-plane (up to nine) images can be simultaneously located on the image plane in the form of a 3×3 "sudoku" box. Especially when the mask pattern of a "crossed" NRQD grating is composed of two orthogonally overlaid mask patterns of an identical "arc" NRQD grating, only five in-focus object planes can be simultaneously recorded; the corner images disappear due to the cancellation of the equal and opposite-sign focal lengths of the two identical "arc" NRQD gratings. To simultaneously record nine equidistant in-focus planes, one "arc" NRQD grating should have three times the object plane separation in the optical system ($\Delta z$, see equation (2)) of the other "arc" NRQD grating, hence the two "arc" NRQD gratings have the curvatures (i.e. $W_{20}$) in the ratio of 1:3 (as illustrated in FIG. 19). For a magnification of 1:1 telecentric 4D multi-plane broadband imaging system, the field of view (FOV) at both the image and object planes is only dependent on the detector's physical size (without aperture) or the aperture itself. Under similar imaging conditions (such as a light-source, microscope set-up, and the imaging quality of a specimen), the combination of our 4D nine-plane broadband imaging system and microscopy technique can have a much larger FOV than that of a different implementation of similar principles investigated elsewhere (so-called multifocus microscopy imaging)—ca. 35×35 microns (60× magnification) or ca. 20×20 microns (100× magnification) (S. Abrahamsson, et al. 'Fast multicolor 3D imaging using aberration-corrected multifocus microscopy', Nature Methods 10, 60-63 (2013)).

For a chromatic correction scheme of a "crossed" NRQD grating based imaging system, two pairs of grisms may be utilized, in which one pair of grisms can be treated in the aforementioned manner, while another pair should be rotated on the optical axis by 90° to correct the chromatic dispersion induced by the 90°-orientated "arc" NRQD grating. Based on the ray-path model of the grism system investigated above, the two pairs of grisms can be designed using the tabulated functions (such as FIG. 10, FIG. 17 and FIG. 18), depending on which type of glass is chosen as the grism substrate. In some cases when optical glass with a high refractive index is needed, i.e. N-SF11 (SCHOTT) glass, grism parameters can be selected from a tabulated function illustrated in FIG. 20. Each grism in the optical system can have an identical design or different parameters, which is highly dependent on the optical relay design. And the grisms can have any location in the optical system as long as the theoretical pre-dispersion and re-collimation for the full incident waveband can be fulfilled. Here we note that the working waveband of grisms and thus the 4D multi-plane broadband imaging system is not limited in the visible spectrum but can be extended to the domain of invisible light, and the principles of optical design are exactly the same as we have demonstrated above.

In this invention, the efficiency of the grating is defined as the energy flow of light diffracted into the orders being measured, relative to the energy flow of the incident light. Both NRQD gratings and grisms with high efficiency are desirable for 4D multi-plane broadband imaging, especially in measuring/tracking rapidly moving objectives with either weak signal or noisy background. For a 4D nine-plane broadband imaging system, the limited light flux must be evenly split into nine images, and two pairs of grisms will be applied for correcting the chromatic dispersion of broadband light induced by the NRQD grating. Therefore, the imaging performance of this optical system is highly dependent on the improvement of the efficiency of each optical element and the reduction of energy loss of the optical system. Grating efficiency improved by multi-etch fabrication, which achieves a multi-level phase profile of a grating, has been discussed before (Y. Feng, 'Optimization of phase gratings with applications to 3D microscopy imaging', a doctorate dissertation, University of Science and Technology of China, 2013). To obtain higher optical efficiency, an NRQD grating can be finely fabricated to achieve a multi-level (digitised) or continuous-level (analogue) profile structure. Further, the optical efficiency of a dispersion compensation set-up can be optimized by a volume phase holographic (VPH) grism instead of a normal grism (a grating combined with a prism), in which case a holographic grating is sandwiched between two prisms (Y. Feng, et al. 'Optical system', UK Patent Application No. GB2504188-A, (2013)). A prism on each side of the VPH grating provides the correct angles of incidence and diffraction at the grating and hence maximizes the efficiency. The refractive indices of the grism components, blazed/VPH grating and prism(s), can be different. In this invention we have found that, in principle, the VPH grism system can significantly improve optical efficiency, and its chromatic correction performance is very similar to that of the normal grism system we used in previous applications. By the use of ultra-fast laser inscription, the grooves of VPH grating may be fabricated at an appropriate angle directly on the prism surface, which would avoid the need of a second prism and thus reduce energy loss. Further investigation of the chromatic correction scheme is still in progress.

The invention claimed is:

1. An apparatus for four-dimensional multi-plane broadband imaging comprising:
   one or more non-reentry quadratically distorted (NRQD) gratings, which are defined as quadratically distorted (QD) gratings without re-entrant grooves, arranged in a multi-element optical system to produce a focal length and a spatial position associated with each diffraction order;
   one or more pairs of grisms arranged to manipulate an optical path in space by wavelength for correcting a chromatic dispersion of a broadband input beam generated by the NRQD grating(s);
   a lens system arranged to effectively modify the focal length of the optical system associated with each diffraction order of the NRQD grating(s) and manipulate the optical path to meet a design requirement of a grism system; and
   means for light detection.

2. An apparatus according to claim 1, wherein the NRQD grating is designed by a combination mask pattern which comprises more than one NRQD arc pattern such that in-focus multi-plane (more than 3) images can be spatially arranged on a single image plane.

3. An apparatus according to claim 1, wherein the NRQD grating has a multi-level or continuous-level profile structure.

4. An apparatus according to claim 1, wherein a variety of NRQD grating types can be utilized, which consist of alternate regularly spaced grooves of different transmissivity, reflectivity, optical thickness or polarisation sensitivity.

5. An apparatus according to claim 1, wherein the grisms are volume phase holographic (VPH) grisms.

6. An apparatus according to claim 1, wherein a design of a grism can be defined by its groove density, which can be specified from 100 to 800 lines per mm when a refractive index of a grism substrate is 1.4-1.5.

7. An apparatus according to claim 1, wherein a design of a grism can be defined by its groove density, which can be specified from 100 to 900 lines per mm when a refractive index of a grism substrate is 1.5-1.6.

8. An apparatus according to claim 1, wherein a design of a grism can be defined by its groove density, which can be specified from 100 to 1200 lines per mm when a refractive index of a grism substrate is 1.6-1.7.

9. An apparatus according to claim 1, wherein a design of a grism can be defined by its groove density, which can be specified from 100 to 1400 lines per mm when a refractive index of a grism substrate is greater than 1.7.

10. An apparatus according to claim 1, wherein refractive indices of grism components, grating(s), and prism(s), can be different.

11. An apparatus according to claim 1, wherein more than one pair of grisms can be utilized such that the chromatic dispersion of a broadband input beam generated by more than one NRQD grating can be corrected.

12. An apparatus according to claim 1, wherein the apparatus is compatible with multi-mode commercial microscopes including fluorescence, bright/dark field, phase contrast, differential interference contrast (DIC) and structured illumination.

13. An apparatus according to claim 1, wherein the apparatus is versatile enough to combine with various modern techniques including microscopy, astronomical optics, optical data storage, biomedical imaging, wavefront analysis and virtual/augmented reality.

14. An apparatus according to claim 2, wherein a variety of NRQD grating types can be utilized, which consist of alternate regularly spaced grooves of different transmissivity, reflectivity, optical thickness or polarisation sensitivity.

15. An apparatus according to claim 3, wherein a variety of NRQD grating types can be utilized, which consist of alternate regularly spaced grooves of different transmissivity, reflectivity, optical thickness or polarisation sensitivity.

16. An apparatus according to claim 2, wherein the NRQD grating has a multi-level or continuous-level profile structure.

17. An apparatus according to claim 16, wherein a variety of NRQD grating types can be utilized, which consist of alternate regularly spaced grooves of different transmissivity, reflectivity, optical thickness or polarisation sensitivity.

18. An apparatus according to claim 5, wherein more than one pair of grisms can be utilized such that the chromatic dispersion of a broadband input beam generated by more than one NRQD grating can be corrected.

19. An apparatus according to claim 5, wherein the apparatus is compatible with multi-mode commercial microscopes including fluorescence, bright/dark field, phase contrast, differential interference contrast (DIC) and structured illumination.

20. An apparatus according to claim 5, wherein the apparatus is versatile enough to combine with various modern techniques including microscopy, astronomical optics, optical data storage, biomedical imaging, wavefront analysis and virtual/augmented reality.

* * * * *